United States Patent
Rajagopalan et al.

(10) Patent No.: US 6,197,884 B1
(45) Date of Patent: Mar. 6, 2001

(54) GOLF BALL COMPOSITIONS CONTAINING HIGH CRYSTALLINE ACID COPOLYMERS AND THEIR IONOMER DERIVATIVES

(75) Inventors: Murali Rajagopalan, South Dartmouth, MA (US); Robert Joseph Statz, Kennett Square, PA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/274,692

(22) Filed: Mar. 23, 1999

Related U.S. Application Data

(62) Division of application No. 08/783,952, filed on Jan. 16, 1997, now Pat. No. 6,100,340.

(51) Int. Cl.[7] ............................ A63B 37/12; A63B 37/06
(52) U.S. Cl. .................. 525/221; 525/330.2; 526/318.6; 473/373; 473/374
(58) Field of Search ................................ 525/221, 330.2; 526/318.6; 473/373, 374

(56) References Cited

U.S. PATENT DOCUMENTS

| | | | |
|---|---|---|---|
| 2,058,201 | 10/1936 | Young | 73/51 |
| 3,264,272 | 8/1966 | Rees | 260/78.5 |
| 3,819,768 | 6/1974 | Molitor | 260/897 B |
| 4,248,990 | 2/1981 | Pieski et al. | 526/317 |
| 4,351,931 | 9/1982 | Armitage | 526/227 |
| 4,526,375 | 7/1985 | Nakade | 273/235 R |
| 4,801,649 | 1/1989 | Statz | 525/183 |
| 4,884,814 | 12/1989 | Sullivan | 273/235 R |
| 4,911,451 | 3/1990 | Sullivan et al. | 273/235 R |
| 4,919,434 | * 4/1990 | Saito . | |
| 5,000,459 | 3/1991 | Isaac | 273/235 R |
| 5,028,674 | 7/1991 | Hatch et al. | 526/216 |
| 5,120,791 | 6/1992 | Sullivan | 525/196 |
| 5,197,740 | 3/1993 | Pocklington et al. | 273/235 R |
| 5,324,783 | 6/1994 | Sullivan | 525/196 |
| 5,415,937 | 5/1995 | Cadorniga et al. | 428/407 |
| 5,553,852 | 9/1996 | Higuchi et al. | 473/373 |
| 5,567,772 | 10/1996 | Hagman et al. | 525/221 |
| 5,580,927 | 12/1996 | Chou et al. | 525/201 |

FOREIGN PATENT DOCUMENTS

WO 95/24448    9/1995   (WO) .

* cited by examiner

*Primary Examiner*—David J. Buttner
(74) *Attorney, Agent, or Firm*—Pennie & Edmonds LLP

(57) ABSTRACT

This invention is directed towards golf balls comprising at least a cover and a core, and optionally one or more intermediate layers, wherein the cover and/or the intermediate layer(s) are formed from a high crystalline copolymer or its ionomer derivatives and blends thereof, wherein the high crystalline copolymer is formed from an ethylene/carboxylic acid copolymer comprising about 5 to about 35 percent by weight acrylic or methacrylic acid, wherein the copolymer is polymerized at a temperature of about 130° C. to 200° C. at pressures of at least 20,000 psi to about 50,000 psi, wherein up to about 70 percent of the acid groups are neutralized with a metal ion.

22 Claims, No Drawings

GOLF BALL COMPOSITIONS CONTAINING HIGH CRYSTALLINE ACID COPOLYMERS AND THEIR IONOMER DERIVATIVES

This is a division, of application Ser. No. 08/783,952 filed Jan. 16, 1997 now U.S. Pat. No. 6,100,340.

FIELD OF THE INVENTION

This invention relates to golf balls comprising at least a cover and a core wherein the cover is formed from a high crystalline acid copolymer or its ionomer derivative or a blend of a high crystalline acid copolymer or its ionomer derivatives and at least one additional material, preferably a second acid copolymer or its ionomer derivatives. This invention is additionally directed towards a golf ball which further comprises, in addition to a cover and a core, one or more intermediate layers interposed between the cover and the core, wherein at least one such intermediate layer is formed from a high crystalline acid copolymer or its ionomer derivatives or a blend of a high crystalline acid copolymer or its ionomer derivatives and at least one additional material, preferably a second acid copolymer or its ionomer derivatives.

BACKGROUND OF THE INVENTION

Generally, there are four types of golf balls on the market today, i.e., one-piece balls, two-piece balls, wound balls, and recently, multilayer balls. One-piece balls are solid balls of a homogeneous construction which are typically used as practice or range balls. Two piece balls are formed by molding a cover around a solid core. Wound balls are formed by winding a thin elastic thread around a liquid filled or solid core to form a wound center upon which a cover is molded. Multilayer balls can have a variety of constructions, such as having multiple core layers, an intermediate or mantle layer(s) or multiple cover layers and combinations thereof.

The composition of a golf ball's cover has been found to affect on the overall performance of the golf ball, including such parameters as its distance, spin rate, "click" and feel etc. Historically, balata, i.e., a trans polyisoprene rubber, was employed as a cover material. Balata provides a soft cover with excellent spin and feel characteristics which enable a skilled golfer to control the flight of the ball by imparting desirable spin on the ball. However, although balata covers exhibit enhanced playability characteristics, they lack the durability properties required for repetitive play. Likewise, balata is expensive and requires time-consuming and labor-intensive manufacturing procedures.

In the middle 1960's, E.I. DuPont de Nemours Company, Inc. developed a new species of resins known as ionomers or ionomer resins. These resins are sold, inter alia, under the trademark SURLYN®, and have essentially replaced balata as a golf ball cover stock material. Ionomeric resins are typically ionic copolymers of an olefin, e.g., ethylene, and an unsaturated carboxylic acid, such as acrylic acid, methacrylic acid or maleic anhydride or itaconic acid or anhydride which has been partially neutralized, e.g., with a metal ion. In some cases an additional softening comonomer such as a long chain alkyl acrylate is also included to form a terpolymer. Such ionomers are usually distinguished by the type of metal ions, the amount of acid and the degree of neutralization.

Ionomer resins are effectively crosslinked at "use" temperatures, but exhibit thermoplastic processability at melt temperatures. Ionomer resins typically exhibit a relatively high tensile strength, good clarity, high abrasion resistance, high stiffness and high resiliency.

The early ionomer resins produced extremely durable covers and imparted improved flight distance to the balls. However, these materials were very hard and therefore lacked the desirable click and feel of balata balls. Moreover, because standard prior art ionomer covers are very hard, it is not possible to impart the desirable spin characteristics to the ball required by the more skilled golfer.

It was subsequently discovered that the physical properties of ionomer resins could be modified according to the amount and type of metal ion, the molecular weight, the composition of the base resin (i.e. the nature and relative content of the olefin, the unsaturated carboxylic acid groups, etc.), the amount of acid, the degree of neutralization and the addition of ingredients such as modifiers, softening agents, etc.

Additionally, in order to overcome some of the negative properties of hard ionomer covers, it became well known that ionomer resins can be blended in order to form ionomer cover compositions that provide improved play characteristics. A number of patents have been granted which are directed towards such ionomer blends.

For example, U.S. Pat. No. 3,819,768 to Molitor discloses golf ball covers comprising blends of zinc and sodium ionomers, which overcome cold cracking problems.

U.S. Pat. No. 4,526,375 to Nakade discloses covers comprising a single ionomer in which a portion of the carboxylic acid groups has been neutralized with sodium, while another portion has been neutralized with magnesium or zinc to overcome a cold cracking problem in covers comprising a single ionomer and a fatigue fracture problem in covers comprising sodium/zinc ionomer blends.

U.S. Pat. No. 4,884,814 to Sullivan discloses golf ball covers comprising blends of a high flexural modulus (hard) ionomer and a low flexural modulus (soft) ionomer. The hard ionomers are copolymers of an olefin and an unsaturated monocarboxylic acid, neutralized with sodium or zinc, and have a flexural modulus of about 30,000 to 55,000 p.s.i. and a Shore D hardness of about 60 to 66. The soft ionomers are terpolymers of an olefin, an unsaturated monocarboxylic acid, and an acrylate ester. These terpolymers are neutralized with zinc or sodium, and have a flexural modulus of about 3,000 to 7,000 p.s.i. and a Shore D hardness of about 25 to 40.

U.S. Pat. No. 4,911,451 to Sullivan et al. discloses a golf ball cover including about 10 to 90 percent by weight of an ethylene-acrylic acid copolymer, containing about 11 percent by weight acrylic acid with about 40 percent of the carboxylic acid groups neutralized with sodium, and about 90 to 10 percent by weight of at least one ethylene-acrylic acid copolymer, containing about 11 to 16 percent acrylic acid with about 10 to 40 percent of the carboxylic acid groups neutralized with zinc.

U.S. Pat. No. 5,000,459 to Isaac discloses golf ball covers made from a lithium ionomer resin, wherein up to 50 percent of the lithium ionomer resin is replaced with at least one sodium ionomer resin. The resulting golf balls are found to be comparable in durability and initial velocity to golf balls having a cover formed with lithium ionomer only.

U.S. Pat. No. 5,120,791 to Sullivan discloses golf ball cover compositions containing blends of at least one hard ionomeric resin, preferably an acrylic acid ionomer, and at least one acrylic acid based soft ionomer. Hard ionomers neutralized with sodium, zinc, magnesium, or lithium, having a flexural modulus of 28 to 55 p.s.i. and a Shore D hardness of 60 to 66 are disclosed. The disclosed soft ionomers are sodium or zinc neutralized terpolymers of an olefin, acrylic acid, and an unsaturated acrylate ester monomer, and have a flexural modulus of about 2,000 to 10,000 p.s.i. and a Shore D hardness of about 20 to 50.

U.S. Pat. No. 5,324,783 to Sullivan discloses golf ball covers which include a blend of about 10 to 30 weight percent of soft ionomer resins and about 90 to 70 weight percent of hard ionomer resins. The soft ionomers are terpolymers of an olefin, acrylic or methacrylic acid, and an unsaturated acrylate ester.

U.S. Pat. No. 5,415,937 to Cadorniga et al. discloses a golf ball cover material of a blend of 80–50% of a high stiffness ionomer and 20 to 50% of a very low modulus ionomer ("VLMI") to improve the feel and playability of the ball when compared to a standard ionomer cover, while retaining the distance and resilience of the prior art balls.

However, heretofore, there have not been any disclosures in the prior art directed towards forming golf ball covers and/or intermediate layers from a high crystalline ionomer or a blend of a high crystalline ionomer and at least one additional ionomer.

It has now been found that golf balls with covers and/or an intermediate layer(s) formed from a high crystalline acid copolymer or its ionomer derivatives or a blend of a high crystalline acid copolymer or its ionomer derivatives and at least one additional material, preferably a second acid copolymer or its ionomer derivatives exhibit desirable properties such as increased initial velocity (as compared to "conventional", i.e., non-high crystalline ionomer blends) without any adverse impact on the remaining golf ball properties such as hardness, compression, durability and spin rate. The present application is therefore directed towards golf balls constructed with covers and/or intermediate layers formed from such compositions, as well as methods for making such golf balls.

SUMMARY OF THE INVENTION

The present invention relates to a golf ball comprising at least a cover and a core, wherein the cover is formed from: a) a high crystalline acid copolymer or its ionomer derivatives formed from a ethylene/carboxylic acid copolymer comprising about 5 to about 35 percent by weight acrylic or methacrylic acid, wherein the copolymer is polymerized at a temperature of about 130° C. to about 200° C. and a pressure of about 20,000 psi to about 50,000 psi and wherein up to about 70 percent of the acid groups are neutralized with a metal ion; or b) a blend of such a high crystalline acid copolymer or its ionomer derivatives and at least a second material, preferably a second acid copolymer or its ionomer derivatives wherein said second acid copolymer is a conventional acid copolymer or a very low modulus acid copolymer or a high acid copolymer or a second high crystalline acid copolymer.

The present invention is still further directed towards a golf ball comprising at least a cover and a core and one or more intermediate layers interposed between the cover and the core, wherein the cover, the intermediate layer(s) or both are formed from: a) a high crystalline acid copolymer or its ionomer derivatives formed from a ethylene/carboxylic acid copolymer comprising about 5 to about 35 percent by weight acrylic or methacrylic acid, wherein the copolymer is polymerized at a temperature of about 130° C. to about 200° C. and a pressure of about 20,000 psi to about 50,000 psi and wherein up to about 70 percent of the acid groups are neutralized with a metal ion; or b) a blend of such a high crystalline acid copolymer or its ionomer derivatives and at least a second material, preferably a second acid copolymer or its ionomer derivatives wherein said second acid copolymer is a conventional acid copolymer, a very low modulus acid copolymer, a high acid copolymer or a second high crystalline acid copolymer or a high flow acid copolymer.

DETAILED DESCRIPTION OF THE INVENTION

Covers and/or intermediate layers of the golf balls of the present invention are formed from a high crystalline acid copolymer and its ionomer derivatives or a blend of a high crystalline acid copolymer and its ionomer derivatives and at least one additional material, preferably an acid copolymer and its ionomer derivatives. As used herein, the term "high crystalline acid copolymer" is defined as a "product-by-process" in which an acid copolymer or its ionomer derivatives formed from a ethylene/carboxylic acid copolymer comprising about 5 to about 35 percent by weight acrylic or methacrylic acid, wherein the copolymer is polymerized at a temperature of about 130° C. to 200° C., at pressures above about 20,000 psi up to about 50,000 psi, preferably at about 25,000 psi or above, wherein up to about 70 percent of the acid groups are neutralized with a metal ion. The copolymer can have a melt index ("MI") of from about 20 to about 300 g/10 min., preferably about 20 to about 200 g/10 minutes and upon neutralization of the copolymer, the resulting acid copolymer and its ionomer derivatives should have an MI of from 0.1 to 30.0g/10 min.

Suitable high crystalline acid copolymer and its ionomer derivatives compositions and methods for making them are disclosed in U.S. Pat. No. 5,580,927, the disclosure of which is hereby incorporated by reference in its entirety.

The high crystalline acid copolymer or its ionomer erivatives employed in the present invention are preferably formed from a copolymer containing about 5–35 percent, more preferably 9–18, most preferably about 10–13 percent, by weight of acrylic acid, wherein up to about 75 percent, most preferably 60 percent, of the acid groups are neutralized with a metal ion, preferably a sodium, lithium, magnesium or zinc ion.

Generally speaking, high crystalline acid copolymer and its ionomer derivatives are formed by polymerization of their base copolymers at lower temperatures, but at equivalent pressures to those used for forming a conventional acid copolymer and its ionomer derivatives. Conventional acid copolymers are typically polymerized at a polymerization temperature of from at least 200° C. to about 270° C., preferably about 220° C., and at pressures of from about 23,000 to about 30,000 psi. In comparison, the high crystalline acid copolymer and its ionomer derivatives employed in the present invention are produced from acid copolymers that are polymerized at a polymerization temperature of less than 200° C., and preferably from about 130° C. to about 200° C., and at pressures from about 20,000 to about 50,000 psi.

As a result of polymerizing the copolymers at lower temperatures, there is a reduction in the presence of undesirable chemical defects in the polymer chains of the resultant acid copolymer and its ionomer derivatives, including a reduction in short chains and branching of the polymer as a result of the better ordering of the polymer chains. Further, a reduction in such defects results in a polymer which has a higher degree of crystallinity than conventional acid copolymers, thereby resulting in a polymer with an increased melting and freezing point.

In accordance with the present invention, it has been found that high crystalline acid copolymers or their ionomer derivatives can be used either alone or in a blend with other materials, preferably, but not limited to acid copolymers or their ionomer derivatives (e.g., conventional acid copolymer, high acid copolymer, very low modulus acid copolymer, high flow acid copolymer and/or other high crystalline acid copolymers) for forming golf ball cover compositions and/or intermediate layer(s) to provide a ball with improved in-play characteristics, including an increased initial velocity. Additionally, it is believed that high crystalline acid copolymers or their ionomer derivatives can also be blended with other non-ionic materials.

As discussed above, copolymers of ethylene and an unsaturated carboxylic acid such as (meth)acrylic acid, optionally with another comonomer, and their ionomer derivatives are well known. These conventional copolymers typically contain at least 50 weight percent and up to about 95 weight percent ethylene. Typical commercial ionomer derivatives, such as those sold under the trade name SUR-LYN® by E.I. du Pont de Nemours and Company, derive from acid copolymers with about 5 to 35 weight percent (meth)acrylic acid comonomer. As normally prepared, both the acid copolymers and their ionomer derivatives have differential scanning calorimetry (DSC) melting points which are in the region of about 81 to about 96° C., and freezing points in the region of about 40 to about 60° C., depending on the comonomers and amounts thereof present.

In particular, the conventional acid copolymers and their ionomer derivatives (i.e., non-high crystalline) useful in the blends of the present invention are obtained by providing a cross metallic bond to polymers of monoolefin with at least one member selected from the group consisting of unsaturated mono- or di-carboxylic acids having 3 to 12 carbon atoms and esters thereof (the polymer contains 1 to 50 percent by weight of the unsaturated mono- or di-carboxylic acid and/or ester thereof). More particularly, such acidcontaining ethylene copolymer ionomer component includes E/X/Y copolymers where E is ethylene, X is a softening comonomer such as acrylate or methacrylate present in 0–50 (preferably 0–25, most preferably 0–20), weight percent of the polymer, and Y is acrylic or methacrylic acid present in 5–35 (preferably 10–35, more preferably at least about 16–35, most preferably at least about 16–20) weight percent of the polymer, wherein the acid moiety is neutralized 1–90 percent (preferably at least 40 percent, most preferably at least about 60 percent) to form an acid copolymer and its ionomer derivatives by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

Methods of preparing conventional acid copolymers and their ionomer derivatives are well known. Acid copolymers and their ionomer derivatives can be prepared by the method disclosed in U.S. Pat. No. 4,351,931 (Armitage). This patent describes polymers with up to 90 weight percent ethylene, the balance being a carboxylic acid. U.S. Pat. No. 5,028,674 (Hatch et al.) discloses improved methods of polymerizing such copolymers when polar monomers such as acrylic and methacrylic acid are incorporated particularly at a level of higher than 10 weight percent. The preparation of ionomers from acid copolymers is also disclosed in U.S. Pat. No. 3,264,272 (Rees). This is a broad disclosure describing preparation when the starting MI as high as 1000 g/10 minutes, and the MI at the completion of the reaction may be as low as about 0.1 g/10 minutes.

Further, U.S. Pat. No. 4,248,990 (Pieski) describes preparation and properties of acid copolymers at low polymerization temperatures and normal temperatures, as well as low pressures and normal temperatures. Preparation is exemplified by Pieski when the polymerization temperature is as low as 160° C., but also up to 250° C. at normal pressures. The above four patents are hereby incorporated by reference in their entirety.

As also discussed above, blending several ionomers and/or acid copolymers is also well known, and for typical acid copolymers/ionomers which have acid levels of about 9 weight percent and above, incompatibility is not a problem. It is believed that ions are sufficiently labile so that even when ionomers are neutralized with different ions, and/or have different acid levels, different acid monomers, and even third monomers, as well as different levels of neutralization, all ions present will become essentially randomly distributed and associated with all acid groups present in the blend. The ions will be fairly randomly distributed throughout the mix of (chemically) differing underlying polymer chains.

In a first embodiment of the present invention, a golf ball cover and/or intermediate layer(s) is formed from a single high crystalline acid copolymer or its ionomer derivatives. The high crystalline acid copolymer is prepared from a ethylene/carboxylic acid copolymer comprising about 5 to about 35 percent by weight acrylic or methacrylic acid, wherein the copolymer is polymerized at a temperature of about 130° C. to 200° C., at pressures above 20,000 psi up to 50,000 psi, preferably at 25,000 psi or above, wherein up to about 70 percent of the acid groups.are neutralized with a metal ion. When substantially the entire cover is comprised of a single high crystalline acid copolymer and its ionomer derivatives composition, the composition is preferably prepared from a ethylene/carboxylic acid copolymer polymerized at a temperature of about 175° C. to about 200° C. and at from 23,000 to 30,000 psi. The copolymer can have a MI of from 20 to 300 g/10 min., preferably 20 to 200 g/10 min. and upon neutralization of the copolymer, the resulting acid copolymer and its ionomer derivatives should have a MI of from 0.1 to 30.0 g/10 min.

Optionally, the high crystalline acid copolymer and its ionomer derivatives may also include up to about 40 percent by weight, preferably about 10 to about 40 percent by weight, and most preferably about 15–30 percent by weight long chain alkyl acrylate or methacrylate whose alkyl group has from 1 to 8 carbon atoms, e.g., iso-butyl or n-butyl acrylate.

In a second embodiment of the present invention, a cover and/or intermediate layer(s) is formed from at least a first component comprising an acid copolymer or its ionomer derivatives and a second component comprising an acid copolymer or its ionomer derivatives, wherein the first component comprises a high crystalline acid copolymer. The second component may comprise any type of acid copolymer or its ionomer derivatives, including the high crystalline acid copolymers described above. Among the preferred second components are a second high crystalline acid copolymer, a high acid copolymer or a very low modulus acid copolymer.

As used herein, the term "high acid copolymer" is defined as an acid copolymer or its ionomer derivatives which contains at least about 16 percent acid, preferably from about 16 percent to about 35 percent acid, more preferably from about 19 percent to about 22 percent acid and most preferably about 19 percent acid, wherein 10 to 90 percent of the acid is partially neutralized with sodium, manganese, lithium, potassium, zinc, magnesium, calcium or nickel ions. High acid copolymer ionomers are commercially available from DuPont under the tradename SURLYN. Examples of suitable high acid ionomers include SURLYN 8140 (Na), SURLYN 8546 (Li), SURLYN 8240 (Na) and SURLYN 8220 (Na).

As used herein, "very low modulus acid copolymer" (VLMI) are defined as terpolymers comprising of 65 to 70 percent by weight of ethylene, about 20 to 25 percent by weight of n- or iso-butyl-acrylate, and about 10 percent by weight of methacrylic acid, where 10 to 90 percent of the acid groups are neutralized by sodium, zinc, or lithium ions. The VLMI preferably have a melt index of 0.5 to 10 g/10 min, a Shore D hardness of 20 to 50, and a flexural modulus of 2,000 to 8,000. Suitable VLMIs are commercially available from DuPont under the tradename SURLYN. Suitable very low modulus acid ionomer derivatives include SURLYN 8320 (Na), SURLYN 9320 (Zn) and SURLYN 8120 (Na).

In this second embodiment of the invention, the composition is formed from a blend which comprises at least 1, preferably about 5 to about 95, more preferably 10–80, and most preferably about 30–50, percent by weight of the first component and about 99, preferably about 95 to about 5, more preferably 90–20 and most preferably about 70 to about 50 percent by weight of the second component.

In a third embodiment of the invention, the cover and/or intermediate layer(s) composition is formed from a blend of a first component comprising an acid copolymer or its ionomer derivatives, a second component comprising acid copolymer or its ionomer derivatives and a third component wherein acid copolymer or its ionomer derivatives, wherein the first component is a high crystalline acid copolymer and the second and third acid components are selected from among high crystalline acid copolymer, high acid copolymer, very low modulus acid copolymer, high flow acid copolymers and conventional acid copolymers, with the caveat that the second and third acid components are different materials from each other.

In this embodiment of the invention, the cover composition is formed from a blend which comprises at least about 1, preferably about 10 to about 90 and most preferably about 25 to about 75 percent by weight of the first component; about 49.5, preferably about 45 to about 5.0, and most preferably about 37.5 to about 12.5 percent by weight of the second component; and about 49.5, preferably about 45 to about 5.0 and most preferably about 37.5 to about 12.5 percent by weight of the third component.

The acid copolymer/ionomer derivative blends of the present invention preferably have a MI of from 0.1 to 7.0 g/10 min. Thus, if one blend component has a high MI of, for example, 30 g/10 min. there should be a sufficient amount of a low MI second component to reduce the final MI to no more than about 7.0 g/10 minute.

Because blending averages out the level of neutralization, (as well as MI) it is possible to blend acid copolymer/ionomer derivatives having a relatively low level of neutralization, such as 10 percent, with one having a higher level of neutralization provided the overall level of neutralization is above about 25 percent, but less than about 70 percent. While maximum ionomer character (e.g. abrasion and cut resistance) is desirable, there will be a balance between increasing neutralization level to achieve such ionomer character, and keeping it lower to prevent undue reduction in melting and freezing points. Preferably, the overall level of neutralization is below 40 percent.

The blends employed in the present invention can be formed by combining the polymer components by methods familiar to those in the blending art, for example with a two roll mill, a Banbury Mixer, or a single or twin screw extruder, to produce a compatible blend.

The high crystalline acid copolymers or their ionomer derivatives and blends thereof of the present invention can be employed to form the outer cover layer of any type of golf ball construction, i.e., two-piece, wound or multilayer constructions. The cover compositions can be formed about the core construction of such balls using conventional molding techniques (i.e., injection or compression molding) and do not require any special equipment or modification of standard processing techniques.

Further, the high crystalline acid copolymer or their ionomer derivatives and blends thereof of the present invention may also be employed to form any one of the intermediate layers of a multilayer ball. For example, such balls may have a dual cover construction wherein a conventional core is surrounded by a cover which comprises an inner cover layer and an outer layer. Additionally, and/or alternatively, the multilayer ball may also contain an intermediate mantle layer disposed between the core and the cover layer. The mantle layer and/or the core may also comprise a plurality of layers. By the present invention, it is contemplated that, in addition to the cover per se, any interior layer such as an inner cover layer or one or more mantle and/or core layers may be formed from a high crystalline acid copolymer or its ionomer derivatives or blends containing a high crystalline acid copolymer or its ionomer derivatives and at least one additional acid copolymer or its ionomer derivatives. Further, both the outer cover layer as well as any intermediate layer(s) of any multilayer construction may both be formed in the same construction from a high crystalline acid copolymer or blends containing a high crystalline acid copolymer and at least one additional acid copolymer or its ionomer derivatives. The cover and the intermediate layer may be formed from the same blend or may be formed from different blends.

The following examples of golf balls formed according to the present invention are given to illustrate the invention. However, it is to be understood that the examples are for illustrative purposes only and in no manner is the present invention limited to the specific disclosures therein.

EXAMPLES

Examples 1

Table 1 below provides several batch formulations for golf ball cover compositions, including several embodiments employed in the present invention. The blends are given in parts per weight for each ingredient. Batch Number 1 is a conventional cover composition used as a control composition. The high crystalline SURLYNs® used in these formulations were experimental high crystalline ionomer provided by DuPont which where made in accordance with the disclosure U.S. Pat. No. 5,580,927. These SURLYNs® were formed from copolymers containing about 12% acrylic acid, wherein about 60% of the acid groups were neutralized with sodium, lithium, magnesium or zinc.

These balls were finished and then tested for cover hardness, initial velocity and Coefficient of Restitution (COR). The cover hardness was obtained using a Shore D Durometer. The initial velocity results were obtained from a conventional dual pendulum technique disclosed in U.S. Pat. No. 2,058,201 to Young whereby the balls are struck at 39.6 m/s (130 ft/s) and pass through light gates from which the speed of the balls is calculated. The results of this testing are reported below in Tables 2–4 below.

TABLE 1

Blend Formulations for High Crystalline Cover Compositions

| Ingredients | BLEND #1 (Control) | BLEND #2 | BLEND #3 | BLEND #4 | BLEND #5 | BLEND #6 | BLEND #7 | BLEND #8 |
|---|---|---|---|---|---|---|---|---|
| SURLYN 7940 (Li) | 45 | — | — | — | — | — | — | — |
| SURLYN 8320 (Na) | 55 | 55 | 55 | 55 | 55 | 55 | 55 | 55 |
| High Crystalline SURLYN (Na) | — | 45 | — | — | — | 10 | 10 | — |
| High Crystalline SURLYN (Li) | — | — | 45 | — | — | 25 | 25 | 35 |
| High Crystalline SURLYN (Mg) | — | — | — | 45 | — | — | 10 | — |
| High Crystalline SURLYN (Zn) | — | — | — | — | 45 | 10 | — | 10 |
| WHITE CONC. | 5 | 5 | 5 | 5 | 5 | 5 | 5 | 5 |

| Ingredients | BLEND #9 | BLEND #10 | BLEND #11 | BLEND #12 | BLEND #13 | BLEND #14 | BLEND #15 |
|---|---|---|---|---|---|---|---|
| SURLYN 7940 (Li) | — | — | — | — | — | — | 100 |
| SURLYN 8320 (Na) | 55 | 55 | — | — | — | — | — |
| High Crystalline SURLYN (Na) | 10 | — | 100 | — | — | — | — |
| High Crystalline SURLYN (Li) | 35 | 35 | — | 100 | — | — | — |
| High Crystalline SURLYN (Mg) | — | 10 | — | — | 100 | — | — |
| High Crystalline SURLYN (Zn) | — | — | — | — | — | 100 | — |
| WHITE CONC. | 5 | 5 | 5 | 5 | 5 | 5 | 5 |

Using the cover formulations of Table 1, golf balls of a two-piece construction were produced using conventional manufacturing processes. Specifically, a 1.580 inch core comprising a cis 1,4 polybutadiene rubber crosslinked with a metal salt of an unsaturated fatty acid such as zinc diacrylate was employed. Hemispherical cups formed of the cover compositions of the blend formulations in Table 1 were injection molded and subsequently compression molded about the polybutadiene cores using standard molding techniques.

TABLE 2

Properties of Golf Balls Having
High Crystalline Ionomer Cover Compositions

| | | BLEND #1 | BLEND #2 | BLEND #3 | BLEND #4 | BLEND #5 |
|---|---|---|---|---|---|---|
| Cover Hardness (Shore D) | @50° F. | 59 | 59 | 57 | 56 | 54 |
| | @70° F. | 60 | 60 | 61 | 60 | 57 |
| | @90° F.-24 HRS. | 53 | 54 | 57 | 57 | 52 |
| Initial | @50° F. | 248.97 | 244.96 | 248.93 | 249.30 | 248.86 |

TABLE 2-continued

Properties of Golf Balls Having
High Crystalline Ionomer Cover Compositions

| | | BLEND #1 | BLEND #2 | BLEND #3 | BLEND #4 | BLEND #5 |
|---|---|---|---|---|---|---|
| Velocity (f/s) | @70° F. | 251.33 | 251.46 | 251.74 | 251.06 | 251.26 |
| | @90° F. | 251.86 | 252.26 | 252.52 | 252.19 | 251.86 |
| | @120° F. | 252.82 | 253.51 | 253.72 | 253.55 | 253.22 |
| Coefficient of Restitution @125 f/s | @50° F. | 0.791 | 0.791 | 0.795 | 0.795 | 0.791 |
| | @70° F. | 0.802 | 0.802 | 0.802 | 0.799 | 0.799 |
| | @90° F. | 0.809 | 0.812 | 0.812 | 0.811 | 0.810 |
| | @120° F. | 0.813 | 0.818 | 0.819 | 0.817 | 0.815 |

TABLE 3

Properties of Golf Balls Having
High Crystalline Ionomer Cover Compositions

| | | BLEND #6 | BLEND #7 | BLEND #8 | BLEND #9 | BLEND #10 |
|---|---|---|---|---|---|---|
| Cover Hardness (Shore D) | @50° F. | 56 | 57 | 56 | 57 | 55 |
| | @70° F. | 60 | 61 | 59 | 60 | 60 |
| | @90° F.- 24 HRS. | 55 | 55 | 54 | 56 | 55 |
| Initial Velocity (f/s) | @50° F. | 249.09 | 249.12 | 249.37 | 249.10 | 248.71 |
| | @70° F. | 251.49 | 251.31 | 251.64 | 251.50 | 251.61 |
| | @90° F. | 252.15 | 252.01 | 252.06 | 252.22 | 252.29 |
| | @120° F. | 253.36 | 253.06 | 253.40 | 253.35 | 253.44 |
| Coefficient of Restitution @125 f/s | @50° F. | 0.793 | 0.794 | 0.791 | 0.791 | 0.788 |
| | @70° F. | 0.800 | 0.802 | 0.799 | 0.799 | 0.800 |
| | @90° F. | 0.812 | 0.811 | 0.809 | 0.810 | 0.811 |
| | @120° F. | 0.815 | 0.819 | 0.813 | 0.817 | 0.817 |

TABLE 4

Properties of Golf Balls Having
High Crystalline Ionomer Cover Compositions

| | | BLEND #11 | BLEND #12 | BLEND #13 | BLEND #14 | BLEND #15 |
|---|---|---|---|---|---|---|
| Cover Hardness | @50° F. | 72 | 72 | 71 | 69 | 71 |
| | @70° F. | 68 | 67 | 68 | 63 | 64 |
| | @90° F. 24 HRS. | 65 | 65 | 65 | 60 | 63 |
| Initial Velocity (f/s) | @50° F. | 251.24 | 251.06 | 250.66 | 250.51 | 251.09 |
| | @70° F. | 252.83 | 252.55 | 252.21 | 251.32 | 253.07 |
| | @90° F. | 253.59 | 253.53 | 253.18 | 252.11 | 253.72 |
| | @120° F. | 254.29 | 254.01 | 254.28 | 252.87 | 254.36 |
| Coefficient of Restitution @125 f/s | @50° F. | 0.801 | 0.799 | 0.796 | 0.795 | 0.805 |
| | @70° F. | 0.812 | 0.810 | 0.806 | 0.800 | 0.812 |
| | @90° F. | 0.821 | 0.811 | 0.826 | 0.826 | 0.821 |
| | @120° F. | 0.827 | 0.824 | 0.820 | 0.810 | 0.824 |

As illustrated by Tables 2–4 above, golf balls having covers containing high crystalline ionomers and blends thereof exhibit improved initial velocity.

Of particular interest is a comparison of the initial velocities reported for the control blend #1 and high crystalline blend #3. This comparison is of particular interest because both cover blends contain 55 parts of SURLYN 8320 (VLMI) and 45 parts of a lithium ionomer (i.e. Surlyn 7940 for Blend #1 and a high crystalline SURLYN for Blend #3). A comparison of the results for these blends reveals that the golf balls of blend #3 typically had an initial velocity of about 0.41 to about 0.90 ft./sec. greater than those of blend #1 as tested at temperatures of 70–120° F. respectively.

One of ordinary skill in the art would readily recognize that such increases represent appreciable increases in initial velocity that would result in greater overall distance.

Example 2

The thermal behavior of various ionomer blends has been investigated. For example, Table 5 below illustrates the thermal behavior of certain specific high crystalline ionomers as compared to non-high crystalline ionomers having similar blend components.

TABLE 5

Thermal Behavior of Ionomers

| BLEND # | COMP. WT. % | % NEUT; ION | POLY. TEMP. (° C.) | Tm (° C.) | Tc (° C.) | HEAT XRYST. |
|---|---|---|---|---|---|---|
| 1 | E/MAA; 85/15 | 40; Na | 230–255 | 88 | 50 | 38 |
| 2 | E/MAA; 85/15 | 59; Na | 230–255 | 88 | 47 | 30 |
| 3 | E/MAA; 85/15 | 30; Na | 170 | 103 | 81 | 76 |
| 4 | E/MAA; 85/15 | 60; Na | 170 | 101 | 61 | 36 |

Poly Temp. = Polymerization Temperature; Tm = peak melting point; Tc = peak freezing point; Heat Xryst = heat of crystallization in Joules/gram As illustrated above, the high crystalline ionomers exhibit markedly higher melting points, freezing points and heat of crystallization. This is believed to be due to the reduction in short chains and branching of the polymer as a result of the lower polymerization temperature.

While it is apparent that the illustrative embodiments of the invention herein disclosed fulfills the objective stated above, it will be appreciated that numerous modifications and other embodiments may be devised by those skilled in the art. Therefore, it will be understood that the appended claims are intended to cover all such modifications which come within the spirit and scope of the present invention.

We claim:

1. A golf ball comprising a cover, a core and at least one intermediate layer disposed concentrically between the cover and the core, wherein the at least one intermediate layer is comprised of a first component including a first acid copolymer or an ionomer derivative of said first copolymer having a melt index of from about 0.1 to 30.0 g/10 min., said first copolymer comprising an ethylene/carboxylic acid copolymer consisting of about 5 to about 35 percent by weight acrylic or methacrylic acid polymerized at a temperature of from about 130° C. to 200° C. and a pressure of from about 20,000 psi to about 50,000 psi, the first component has a melting point and a freezing point substantially greater than that of a corresponding acid copolymer or ionomer derivative thereof formed at a polymerization temperature greater than 200° C., and wherein, when said first component is said ionomer derivative, up to about 75 percent of acid groups in the ionomer derivative are neutralized with a metal ion.

2. The golf ball of claim 1, wherein at least one of the cover, the intermediate layer and the core comprises at least two layers.

3. The golf ball of claim 1, wherein the copolymer is polymerized at a temperature of from about 175° C. to 200° C.

4. The golf ball of claim 1, wherein the first acid copolymer and its derivative ionomer each have a melt index of from about 0.1 g/10 min. to about 7.0 g/10 min.

5. The golf ball of claim 1, wherein the at least one intermediate layer is formed from a blend comprising said first component and a second component, wherein the second component includes a second acid copolymer or an ionomer derivative of said second copolymer, said second copolymer comprising an ethylene/carboxylic acid copolymer including from about 5 to about 35 percent by weight acrylic or methacrylic acid, and wherein, when said second component is said ionomer derivative, 1 to 90 percent of acid groups in the ionomer derivative are neutralized with a metal ion.

6. The golf ball of claim 5, wherein the blend comprises from about 10 to about 80 percent by weight of the first component and from about 90 to about 20 percent by weight of the second component.

7. The golf ball of claim 1, wherein the at least one intermediate layer is formed from a blend comprising said first component and a second component, wherein the second component comprises a first acid terpolymer or an ionomer derivative of said first terpolymer, said second component comprising from about 5 to about 35 percent by weight acrylic or methacrylic acid, and from about 1 percent to about 40 percent by weight of an alkyl acrylate or methacrylate comprising an alkyl group having from 1 to 8 carbon atoms.

8. The golf ball of claim 7, wherein the blend comprises from about 10 to about 80 percent by weight of the first component and from about 90 to about 20 percent by weight of the second component.

9. The golf ball of claim 1, wherein the at least one intermediate layer further comprises a second and a third component, and wherein the second component and the third component each comprise at least one material independently selected from the group consisting of:

(a) a third acid copolymer or an ionomer derivative of said third copolymer which comprises an ethylene/carboxylic acid copolymer comprising from about 5 to about 35 percent by weight acrylic or methacrylic acid polymerized at a temperature of from about 130° C. to 200° C. and a pressure of from about 20,000 psi to about 50,000 psi, wherein the third acid copolymer or ionomer derivative thereof has a melting point and a freezing point substantially higher than that of a corresponding acid copolymer or ionomer derivative thereof formed at a polymerization temperature greater than 200° C. and wherein, when at least one of the second and the third component is the ionomer derivative, up to about 75 percent of acid groups thereof are neutralized with a metal ion;

(b) a fourth acid copolymer or an ionomer derivative of said fourth copolymer, comprising an ethylene/carboxylic acid copolymer which comprises at least 16 to about 30 percent by weight acrylic or methacrylic acid;

(c) a fifth acid copolymer or an ionomer derivative of said fifth copolymer, which comprises an ethylene/carboxylic acid copolymer comprising about 5 to about 15 percent by weight acrylic or methacrylic acid;

(d) a second acid terpolymer or an ionomer derivative of said second terpolymer, which comprises at least about 1 percent by weight to about 40 percent by weight of an alkyl acrylate or methacrylate comprising an alkyl group having from 1 to 8 carbon atoms, wherein, when the second acid terpolymer is the ionomer derivative, 10 to 90 percent of acid groups of the second terpolymer are neutralized with a metal ion; and (e) a non-ionic homopolymer or a non-ionic copolymer.

10. The golf ball of claim 9, wherein the blend comprises from about 10 to about 90 percent by weight of the first component, from about 45 to about 5 percent by weight of the second component and from about 45 to about 5 percent by weight of the third component.

11. The golf ball of claim 1, wherein the intermediate layer further comprises a second component comprising at least one material selected from the group consisting of:

(a) a second acid copolymer or an ionomer derivative of said second copolymer, which comprises an ethylene/carboxylic acid copolymer comprising from about 5 to about 35 percent by weight acrylic or methacrylic acid polymerized at a temperature of from about 130° C. to 200° C. and a pressure of from about 20,000 psi to about 50,000 psi, wherein the second acid copolymer or ionomer derivative thereof has a melting point and a freezing point substantially higher than that of a corresponding acid copolymer or ionomer derivative thereof formed at a polymerization temperature greater than 200° C., and wherein, when the second component is the ionomer derivative, up to about 75 percent of acid groups thereof are neutralized with a metal ion;

(b) a third acid copolymer or an ionomer derivative of said third copolymer, comprising an ethylene/carboxylic acid copolymer which comprises at least 16 to about 30 percent by weight acrylic or methacrylic acid;

(c) a fourth acid copolymer or an ionomer derivative of said fourth copolymer, which comprises an ethylene/carboxylic acid copolymer comprising about 5 to about 15 percent by weight acrylic or methacrylic acid;

(d) an acid terpolymer or an ionomer derivative of said terpolymer, which comprises at least about 1 percent by weight to about 40 percent by weight of an alkyl acrylate or methacrylate comprising an alkyl group having from 1 to 8 carbon atoms, wherein, when the second acid terpolymer is the ionomer derivative, 10 to 90 percent of acid groups of the second terpolymer are neutralized with a metal ion; and (e) a non-ionic homopolymer or a non-ionic copolymer.

12. A golf ball comprising a cover, a core and at least one intermediate layer disposed concentrically between the cover and the core, wherein the at least one intermediate layer comprises a blend of a first component and a second component, wherein the first component and the second component are selected from the group consisting of a first, acid copolymer, a second acid copolymer, and ionomer derivatives of said first and said second copolymers, said first and said second copolymer each comprising an ethylene/carboxylic acid copolymer consisting of about 5 to about 35 percent by weight acrylic or methacrylic acid polymerized at a temperature of from about 130° C. to 200° C. and a pressure of from about 20,000 psi to about 50,000 psi, wherein the first and second acid copolymers and their ionomer derivatives have a melting point and a freezing point substantially greater than that of a corresponding acid copolymer or ionomer derivative thereof formed at a polymerization temperature greater than 200° C., and wherein, when at least one of the first and second components is said ionomer derivative, up to about 75 percent of acid groups therein are neutralized with a metal ion.

13. The golf ball of claim 12, wherein the at least one intermediate layer further comprises a third component, said third component comprising at least one material selected from the group consisting of:

(a) a third acid copolymer or an ionomer derivative of said third copolymer, which comprises an ethylene/carboxylic acid copolymer comprising from about 5 to about 35 percent by weight acrylic or methacrylic acid polymerized at a temperature of from about 130° C. to 200° C. and a pressure of from about 20,000 psi to about 50,000 psi, wherein the third acid copolymer or ionomer derivative thereof has a melting point and a freezing point substantially higher than that of a corresponding acid copolymer or ionomer derivative thereof formed at a polymerization temperature greater than 200° C., and wherein, when the third component is the ionomer derivative, up to about 75 percent of acid groups thereof are neutralized with a metal ion;

(b) a fourth acid copolymer or an ionomer derivative of said fourth copolymer, comprising an ethylene/carboxylic acid copolymer which comprises at least 16 to about 30 percent by weight acrylic or methacrylic acid;

(c) a fifth acid copolymer or an ionomer derivative of said fifth copolymer, which comprises an ethylene/carboxylic acid copolymer comprising about 5 to about 15 percent by weight acrylic or methacrylic acid;

(d) an acid terpolymer or an ionomer derivative of said terpolymer, which comprises at least about 1 percent by weight to about 40 percent by weight of an alkyl acrylate or methacrylate comprising an alkyl group having from 1 to 8 carbon atoms, wherein, when the second acid terpolymer is the ionomer derivative, 10 to 90 percent of acid groups of the second terpolymer are neutralized with a metal ion; and (e) a non-ionic homopolymer or a non-ionic copolymer.

14. The golf ball of claim 13, wherein the blend comprises from about 10 to about 90 percent by weight of the first component, from about 45 to about 5 percent by weight of the second component and from about 45 to about 5 percent by weight of the third component.

15. A method for making a multi-layer golf ball comprising:

(a) forming a golf ball core;

(b) molding at least one intermediate layer about the golf ball core; and (c) molding a cover around the intermediate layer wherein the at least one intermediate layer is formed of a composition comprising a first component including a first acid copolymer or an ionomer derivative of said first copolymer having a melt index of from about 0.1 to 30.0 g/10 min., said first copolymer comprising an ethylene/carboxylic acid copolymer consisting of about 5 to about 35 percent by weight acrylic or methacrylic acid polymerized at a temperature of from about 130° C. to 200° C. and a pressure of from about 20,000 psi to about 50,000 psi, wherein the first component has a melting point and a freezing point substantially higher than that of a corresponding acid copolymer or ionomer derivative thereof formed at a polymerization temperature greater than 200° C., and wherein, when said first component is a an ionomer derivative, up to about 75 percent of acid groups are neutralized with a metal iron.

16. The method of claim 15, further comprising blending said first component with a second component to form said composition, said second component including a second acid copolymer or an ionomer derivative of said second copolymer, said second component comprising an ethylene/carboxylic acid copolymer comprising from about 5 to about 35 percent by weight acrylic or methacrylic acid, and wherein, when said second component is said ionomer derivative, 1 to 90 percent of acid groups in the ionomer derivative are neutralized with a metal ion.

17. The method of claim 15, further comprising blending said first component with a second component to form said composition, said second component including a first acid terpolymer or an ionomer derivative of said first terpolymer, said second component comprising from about 5 to about 35 percent by weight acrylic or methacrylic acid, and from about 1 percent to about 40 percent by weight of an alkyl acrylate or methacrylate comprising an alkyl group having from 1 to 8 carbon atoms.

18. The method of claim 15, further comprising blending the first component with a second component and a third component, wherein the second component and the third component each comprises at least one material selected from the group consisting of:

(a) a third acid copolymer or an ionomer derivative of said third copolymer, which comprises an ethylene/carboxylic acid copolymer comprising from about 5 to about 35 percent by weight acrylic or methacrylic acid polymerized at a temperature of from about 130° C. to 200° C. and a pressure of from about 20,000 psi to about 50,000 psi, wherein the third acid copolymer or ionomer derivative thereof has a melting point and a freezing point substantially higher than that of a corresponding acid copolymer or ionomer derivative thereof formed at a polymerization temperature greater than 200° C., and wherein, when at least one of the second and the third component is the ionomer derivative, up to about 75 percent of acid groups thereof are neutralized with a metal ion;

(b) a fourth acid copolymer or an ionomer derivative of said fourth copolymer, comprising an ethylene/carboxylic acid copolymer which comprises at least 16 to about 30 percent by weight acrylic or methacrylic acid;

(c) a fifth acid copolymer or an ionomer derivative of said fifth copolymer, which comprises an ethylene/carboxylic acid copolymer comprising from about 5 to about 15 percent by weight acrylic or methacrylic acid;

(d) a second acid terpolymer or an ionomer derivative of said second terpolymer, which comprises at least about 1 percent by weight to about 40 percent by weight of an alkyl acrylate or methacrylate comprising an alkyl group having from 1 to 8 carbon atoms, wherein, when the second acid terpolymer is the ionomer derivative, 10 to 90 percent of acid groups of the second terpolymer are neutralized with a metal ion; and (e) a non-ionic homopolymer or a non-ionic copolymer.

19. A method for making a golf ball comprising:

(a) forming a blend comprising a first component and at least one second component different from the first component, wherein the first component comprises a first acid copolymer or an ionomer derivative of said first copolymer, said first copolymer comprising an ethylene/carboxylic acid copolymer comprising from about 5 to about 35 percent by weight acrylic or methacrylic acid polymerized at a temperature of from about 130° C. to 200° C. and a pressure of from about 20,000 psi to about 50,000 psi, wherein the first component has a melting point and a freezing point substantially greater than that of a corresponding acid copolymer or ionomer derivative thereof formed at a polymerization temperature greater than 200° C., and wherein, when said first component is an ionomer derivative, up to about 75 percent of acid groups in the ionomer derivative are neutralized with a metal ion;

(b) forming a golf ball core from the blend (c) molding at least one intermediate layer about the golf ball core; and (d) molding a cover around the golf ball core to form a golf ball.

20. The method of claim 19, further comprising blending said first component with a second component to form said composition, said second component including a second acid copolymer or an ionomer derivative of said second copolymer, said second component comprising an ethylene/carboxylic acid copolymer comprising from about 5 to about 35 percent by weight acrylic or methacrylic acid, and wherein, when said second component is said ionomer derivative, 1 to 90 percent of acid groups in the ionomer derivative are neutralized with a metal ion.

21. The method of claim 19, further comprising blending said first component with a second component to form said composition, said second component including a first acid terpolymer or an ionomer derivative of said first terpolymer, said second component comprising from about 5 to about 35 percent by weight acrylic or methacrylic acid, and from about 1 percent to about 40 percent by weight of an alkyl acrylate or methacrylate comprising an alkyl group having from 1 to 8 carbon atoms.

22. The method of claim 19, further comprising blending the first component with a second component and a third component, wherein the second component and the third component each comprises at least one material selected from the group consisting of:

(a) a third acid copolymer or an ionomer derivative of said third copolymer, which comprises an ethylene/carboxylic acid copolymer comprising from about 5 to about 35 percent by weight acrylic or methacrylic acid polymerized at a temperature of from about 130° C. to 200° C. and a pressure of from about 20,000 psi to about 50,000 psi, wherein the third acid copolymer or ionomer derivative thereof has a melting point and a freezing point substantially higher than that of a corresponding acid copolymer or ionomer derivative thereof formed at a polymerization temperature greater than 200° C., and wherein, when at least one of the second and the third component is the ionomer derivative, up to about 75 percent of acid groups thereof are neutralized with a metal ion;

(b) a fourth acid copolymer or an ionomer derivative of said fourth acid copolymer, comprising an ethylene/carboxylic acid copolymer which comprises at least 16 to about 30 percent by weight acrylic or methacrylic acid;

(c) a fifth acid copolymer or an ionomer derivative of said fifth copolymer, which comprises an ethylene/carboxylic acid copolymer comprising from about 5 to about 15 percent by weight acrylic or methacrylic acid;

(d) a second acid terpolymer or an ionomer derivative thereof, which comprises at least about 1 percent by weight to about 40 percent by weight of an alkyl acrylate or methacrylate comprising an alkyl group having from 1 to 8 carbon atoms, wherein, when the second acid terpolymer is the ionomer derivative, 10 to 90 percent of acid groups of the second terpolymer are neutralized with a metal ion; and (e) a non-ionic homopolymer or a non-ionic copolymer.

* * * * *

UNITED STATES PATENT AND TRADEMARK OFFICE
CERTIFICATE OF CORRECTION

PATENT NO.      : 6,197,884 B1
DATED           : March 6, 2001
INVENTOR(S)     : M. Rajagopalan et al.

Page 1 of 1

It is certified that error appears in the above-identified patent and that said Letters Patent is hereby corrected as shown below:

Column 14,
Line 43 (claim 12, line 6), delete the comma after "first".

Column 15,
Line 54 (claim 15, line 21), delete "a".

Column 16,
Line 65 (claim 19, line 19), insert a semicolon after "blend".

Signed and Sealed this

Thirtieth Day of October, 2001

Attest:

NICHOLAS P. GODICI
Attesting Officer       Acting Director of the United States Patent and Trademark Office